United States Patent
Broadway et al.

[11] Patent Number: 5,839,663
[45] Date of Patent: Nov. 24, 1998

[54] GAS TURBINE EXHAUST NOZZLE FLAP AND FLAP SEAL APPARATUS

[75] Inventors: D. Andrew Broadway, Anderson, S.C.; Raymond J. Bruchez, Jr., Jupiter; Martin C. Lady, Palm Beach Gardens, both of Fla.

[73] Assignee: United Technologies Corporation, Hartford, Conn.

[21] Appl. No.: 685,323

[22] Filed: Jul. 23, 1996

[51] Int. Cl.$^6$ .................................................. B05B 12/00
[52] U.S. Cl. ............................. 239/265.35; 239/265.39; 239/265.43; 277/235 A
[58] Field of Search ......................... 239/265.11, 265.19, 239/265.33, 265.35, 265.37, 265.39, 265.41, 265.43; 277/53, 235 A, DIG. 6

[56] References Cited

U.S. PATENT DOCUMENTS

| | | | |
|---|---|---|---|
| 2,865,165 | 12/1958 | Kress | 239/265.39 |
| 2,910,829 | 11/1959 | Meyer | 239/265.39 |
| 3,792,815 | 2/1974 | Swavely et al. | 239/265.39 |
| 3,813,608 | 5/1974 | Holowach et al. | 239/265.37 |
| 3,892,358 | 7/1975 | Gisslen | 239/265.39 |
| 4,114,248 | 9/1978 | Smith et al. | 29/460 |
| 4,171,093 | 10/1979 | Honeycutt, Jr. et al. | 239/265.39 |
| 4,203,286 | 5/1980 | Warburton | 60/266 |
| 4,361,281 | 11/1982 | Nash | 239/265.37 |
| 4,645,217 | 2/1987 | Honeycutt, Jr. et al. | 277/230 |
| 4,799,623 | 1/1989 | Bruchez, Jr. et al. | 239/265.41 |
| 4,884,820 | 12/1989 | Jackson et al. | 277/53 |
| 5,039,014 | 8/1991 | Lippmeier | 239/265.39 |
| 5,076,496 | 12/1991 | Lippmeier | 239/265.41 |
| 5,232,158 | 8/1993 | Barcza | 239/265.35 |
| 5,261,605 | 11/1993 | McLafferty et al. | 239/265.35 |
| 5,323,965 | 6/1994 | Froemming et al. | 239/265.37 |
| 5,328,098 | 7/1994 | Barcza et al. | 239/265.35 |
| 5,522,546 | 6/1996 | Jarvis | 239/265.19 |
| 5,584,173 | 12/1996 | Lybarger | 239/265.11 |

*Primary Examiner*—Andres Kashnikow
*Assistant Examiner*—Lisa Ann Douglas
*Attorney, Agent, or Firm*—Richard D. Getz

[57] ABSTRACT

An exhaust nozzle for a gas turbine engine is provided which includes a plurality of flaps and an abradable coating. Each flap includes seal surfaces with depressions disposed therein. The flaps are disposed about a structure within the engine, and are pivotly attached to that structure. Adjacent flaps overlap along the seal surfaces, and movement of the nozzle causes relative motion between the adjacent flaps. The abradable coating is attached to the seal surfaces, and contact between adjacent flaps causes the abradable coating to abrade. The remaining abradable coating fills the depressions within the seal surfaces.

10 Claims, 4 Drawing Sheets

FIG.6
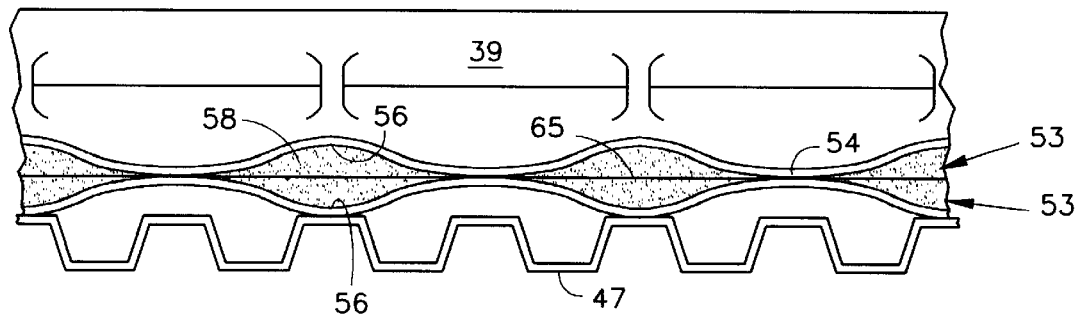
FIG.7
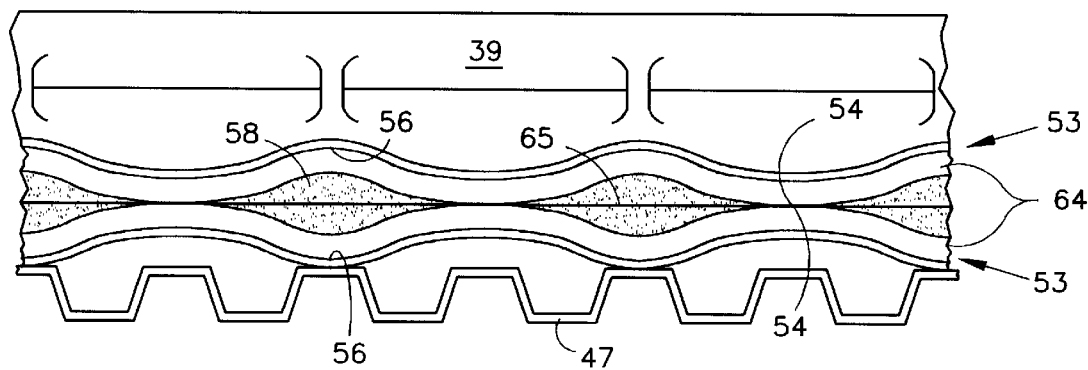
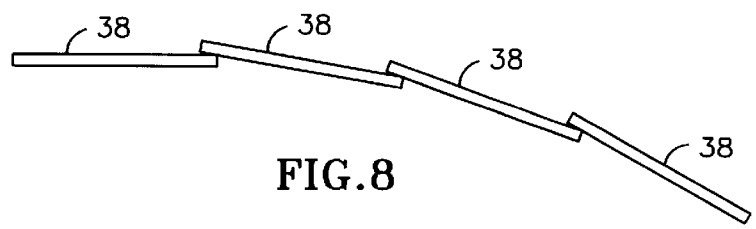
FIG.8

GAS TURBINE EXHAUST NOZZLE FLAP AND FLAP SEAL APPARATUS

BACKGROUND OF THE INVENTION

1. Technical Field

The present invention relates to gas turbine nozzle assemblies in general, and to apparatus for sealing between flaps and between flaps and flap seals in particular.

2. Background Information

An exhaust duct, or nozzle, disposed aft of the turbine provide a means within a gas turbine engine to accelerate core gas flow exiting the engine and thereby produce greater thrust. In commercial gas turbine applications, the nozzle is typically a convergent nozzle with a fixed orifice. The orifice, or throat, refers to the minimum cross-sectional area within the nozzle. The fixed orifice is sized to provide optimum performance for typical operating parameters. High performance gas turbine engines, on the other hand, often use a variable orifice nozzle aft of the turbine which can be sized for a variety of operating conditions.

A variable orifice nozzle can be as simple as a flap section aft of the turbine that can be manipulated radially inward or outward to change the orifice cross-sectional area. More common, however, are convergent-divergent (C/D) variable orifice nozzles which typically include a balance section, a convergent section, and a divergent section pivotly attached to one another. Each section generally includes flaps and flap seals circumferentially disposed, attached to one of the other sections or to a structural member within the engine. The alternately disposed flaps and flap seals accommodate changes in orifice area and nozzle axis skew (if the nozzle is vectorable) by sliding relative to one another and overlapping each other more or less as the orifice area decreases or increases, respectively. The variable orifice of the C/D nozzle is typically disposed between the aft end of the convergent section and the forward end of the divergent section. Orifice area increases and decreases when the aft end of the convergent section is displaced radially outward and inward, respectively. U.S. Pat. No. 5,328,098, issued to Barcza, discloses an example of a variable orifice C/D nozzle. The ability of all variable orifice nozzles to change orifice area requires considerable flexibility in each section of the nozzle. Flexibility is particularly important in vectorable nozzles.

Flap and flap seal arrangements are a known means for providing necessary flexibility in variable orifice and vectorable nozzles. Flexibility is provided by flaps and flap seals overlapping one another and sliding relative to one another during nozzle geometry changes. Unfortunately, the interfaces between flaps and/or between flaps and flap seals which permit flexibility can also permit substantial, undesirable gas leakage across the flaps and flap seals. Leak paths are created, in most cases, by tolerance variations in the flaps and/or flap seals, or by thermal and/or pressure induced mechanical distortion. Tolerancing is a problem because flaps and flap seals are typically fabricated from lightweight sheet metal which cannot be held to tight tolerances in a cost effective manner. Mechanical distortion often occurs as a result of the harsh thermal environment and extreme pressure loads within the nozzle.

In those applications where high temperature core gas necessitates cooling in the nozzle, bypass air bled from engine fan sections (or compressor sections) is directed through annular regions surrounding the nozzle, extracting heat before being subsequently released into the core gas flow. The fan sections "work" the bypass air to a pressure higher than that of the core gas flow within the nozzle. The higher pressure bypass air cools the nozzle by bleeding through the nozzle and passing into the core gas flow. Bypass air can also be selectively bled into the nozzle to augment air already within the core gas flow for combustion purposes. A person of skill in the art will recognize that the work introduced into the bypass air is substantially lost during passage through the engine (due to leakage, pressure loss, etc.) and it is, therefore, desirable to minimize the amount of bypass air required. In those applications that do not use bypass air, the undesirable leak paths between flaps and/or flaps and flap seals can allow high temperature core gas flow to pass into inner areas of the nozzle structure susceptible to thermal damage. In all cases, leakage between flaps and between flaps and flap seals directly relates to increased manufacturing costs, fuel consumption, wear, maintenance, and decreased engine performance.

What is needed, therefore, is a nozzle flap arrangement that minimizes cooling air leakage between flaps and/or flaps and flap seals.

DISCLOSURE OF THE INVENTION

It is an object of the present invention, therefore, to provide a nozzle flap and flap seal arrangement that minimizes cooling air leakage therebetween.

It is a further object of the present invention to provide a nozzle flap and flap seal arrangement that facilitates relative motion between adjacent flaps and flap seals.

It is a further object of the present invention to provide a nozzle flap and flap seal arrangement that minimizes wear between adjacent flaps and flap seals.

According to one embodiment of the present invention, an exhaust nozzle for a gas turbine engine is provided which includes a plurality of flaps and an abradable coating. Each flap includes seal surfaces with depressions disposed therein. The flaps are disposed about a structure within the engine, and are pivotly attached to that structure. Adjacent flaps overlap along the seal surfaces, and movement of the nozzle causes relative motion between the adjacent flaps. The abradable coating is attached to the seal surfaces, and contact between adjacent flaps causes the abradable coating to abrade. The remaining abradable coating fills the depressions within the seal surfaces.

In another embodiment of the present invention, an exhaust nozzle for a gas turbine engine is provided which includes a plurality of flaps, each having a first seal surface, and flap seals each having a second seal surface. The flaps and flap seals are alternately disposed about a structure within the engine. The flaps pivotly attach to the structure, and adjacent flaps and flap seals overlap. Movement of the nozzle causes relative motion between the flaps and flap seals. An abradable coating is attached to one (or both) of the first or second seal surfaces. Contact between the other of the first or second seal surfaces and the abradable coating (or between the two coated seal surfaces) causes the abradable coating to abrade, leaving the abradable coating in the first and/or second depressions of the first and/or second seal surfaces to which the abradable coating is attached.

According to an aspect of the present invention, an abrasion resistant coating is attached to the first and second seal surfaces. The abradable coating may be attached to the abrasion resistant coating on one or both of the first and second seal surfaces.

An advantage of the present invention is that it minimizes leakage within a nozzle. Nozzle flaps and flap seals are often manufactured with loose tolerances to be cost effective. The surfaces along which the flap and flap seals contact often have depressions within them which provide undesirable leak paths when the flaps are joined, or the flaps and flap seals are joined. In the present invention, contact between flaps or between flaps and flap seals along the seal surfaces abrades the abradable, leaving coating in the depressions within the seal surfaces, thereby substantially eliminating the leak paths.

A further advantage of the present invention is that it minimizes wear between adjacent flaps and flap seals by redistributing the load over an increased portion of the contact surfaces. When presently available flaps and flaps seals having depressions are assembled together, contact between the two surfaces occurs at discrete points, and the entire load forcing the flaps and flap seals is borne as a series of point loads. Under the present invention, contact is made between flap and flap seals along extended surfaces, thereby distributing the load over a greater area and decreasing the normal force at any particular point. Frictional wear, which is directly related to the normal force, is accordingly decreased.

A still further advantage of the present invention is that the abradable coating can facilitate relative motion between adjacent flaps, or between adjacent flaps and flap seals. Specifically, the abradable coating can include means for lubricating between the flap and flap seals along the first and second seal surfaces. The lubricating means facilitates motion by lubricating contact points between flaps, or between flaps and flap seals. A further advantage of the present invention is that the lubricating means can be encased within the abradable coating to protect the lubricating means and enable the lubricating means to be dispensed in a uniform manner over an extended period of time.

The present invention provides other advantages over flap and flap seal arrangements having only an abrasion resistant coating. If an abrasion resistant coating wears over time, leakage paths through depressions may be sealed provided enough abrasion resistant coating has been applied and the depression is relatively shallow. This approach is undesirable, however, because: (1) the abrasion resistant coating remaining on the contact points between the flaps and/or the flaps and flap seals can be left too thin or possibly worn through, thereby exposing the flap or flap seal to mechanical damage; (2) the wear process takes a considerable amount of time during which cooling air is lost; and (3) the depressions in the flaps and flap seals may be too deep to fill, consequently providing an undesirable leak path. The present invention, on the other hand, uses abradable material to fill the voids through which cooling air may leak. The abradable material abrades in a relatively short period of time to minimize the amount of cooling air lost, while at the same time minimizing wear.

A still further advantage of the present invention is that favorable wear characteristics can be attained with a thinner abrasion resistant coating, when the abrasion resistant coating is utilized in coordination with the abradable coating. A person of skill in the art will recognize that it is advantageous to make nozzle components, including flaps and flap seals, as lightweight as possible. In most instances, flaps and flap seals designed to be lightweight are also more flexible. A flexible substrate is generally problematic for abrasion resistant coatings which tend to increase in friability with increases in thickness. The thinner layer of abrasion resistant coating possible with the present invention avoids the cracking and chipping associated with thicker abrasion resistant coatings and enables lightweight, flexible nozzle components to be used. The thinner layer of abrasion resistant coating possible with the present invention also extends the service life of the flap or flap seal.

These and other objects, features and advantages of the present invention will become apparent in light of the detailed description of the best mode embodiment thereof, as illustrated in the accompanying drawings.

BRIEF DESCRIPTION OF THE DRAWINGS

FIG. 6 is a diagrammatic lengthwise view of a flap and flap seal lapped together such that each contacts the other along substantially parallel surfaces.

FIG. 7 shows the diagrammatic lengthwise view of a flap and flap seal lapped together shown in FIG. 6, further including a coating of wear resistant material attached to both the flap and flap surfaces.

FIG. 8 shows a diagrammatic view of a nozzle section having flaps overlapping flaps.

BEST MODE FOR CARRYING OUT THE INVENTION

Figure 1:
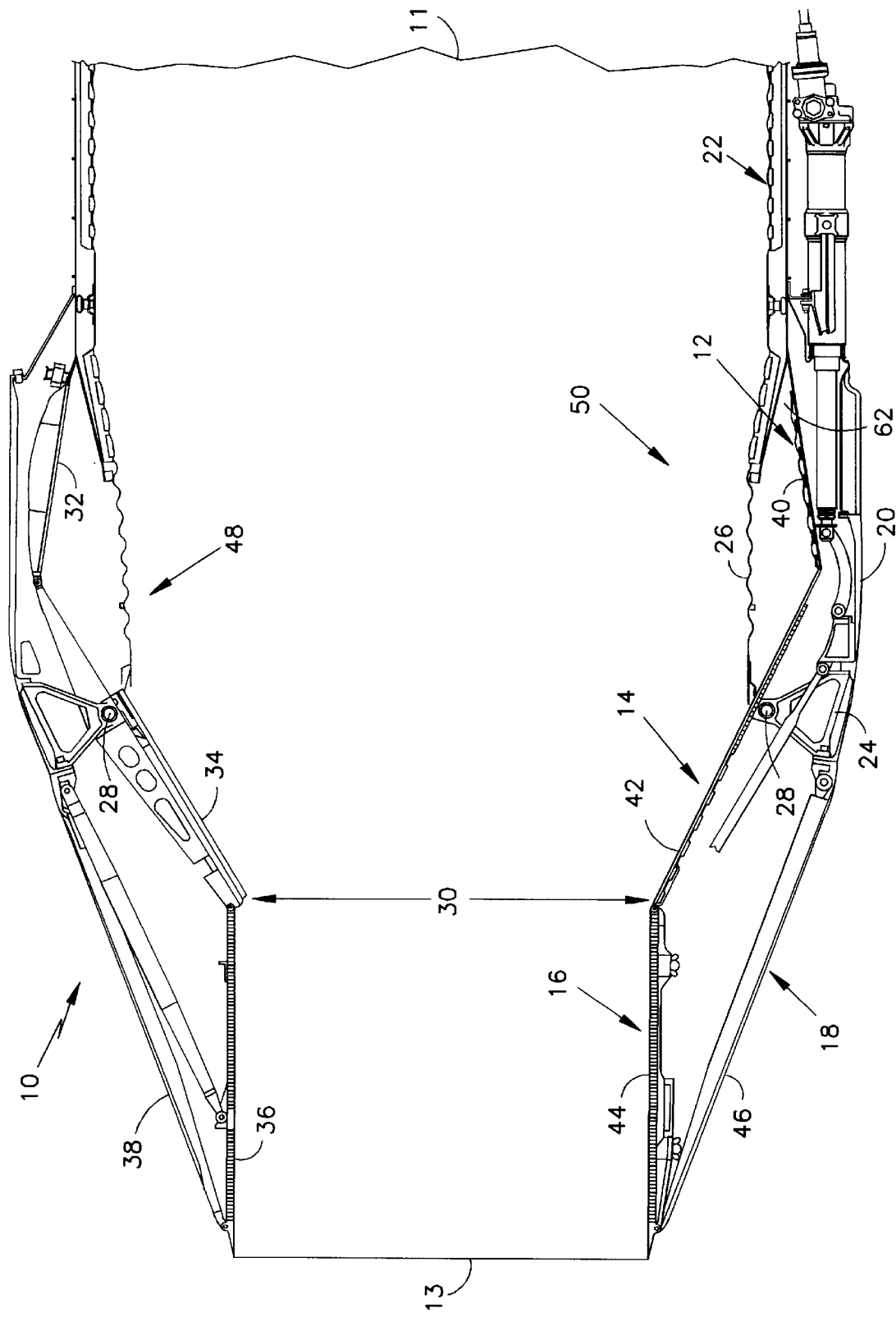
FIG. 1 is a diagrammatic sectional view of a convergent-divergent nozzle with a balance section.

Referring to FIG. 1, a convergent-divergent (C/D) nozzle 10 is shown in diagrammatic cross-section having a forward end 11 and an aft end 13. The nozzle 10 includes a balance section 12, a convergent section 14, a divergent section 16, and an exterior fairing 18. A static outer casing 20 surrounds a portion of the augmentor 22 and a portion of the nozzle 10. The balance section 12 is disposed radially inside of the outer case 20, pivotly mounted along its forward end adjacent the augmentor 22. The divergent section 16 is disposed radially inside the exterior fairing 18, pivotly attached along its aft end to the exterior fairing 18. The exterior fairing 18 extends between the static outer casing 20 and the aft end of the divergent section 16. The convergent section 14 is disposed axially between the balance 12 and divergent 16 sections, pivotly attached to both. The convergent section 14 is also pivotly attached to brackets 24 mounted on the outer casing 20. The brackets 24 are located adjacent the axial position where the augmentor liner 26 and the convergent section 14 meet. The position of the bracket pivot 28 enables the convergent section 14 to pivot relative to the augmentor liner 26 as though the two were pivotly attached. The variable orifice 30 of the nozzle 10 is formed between the aft end of the convergent section 14 and the forward end of the divergent section 16.

Figure 2:
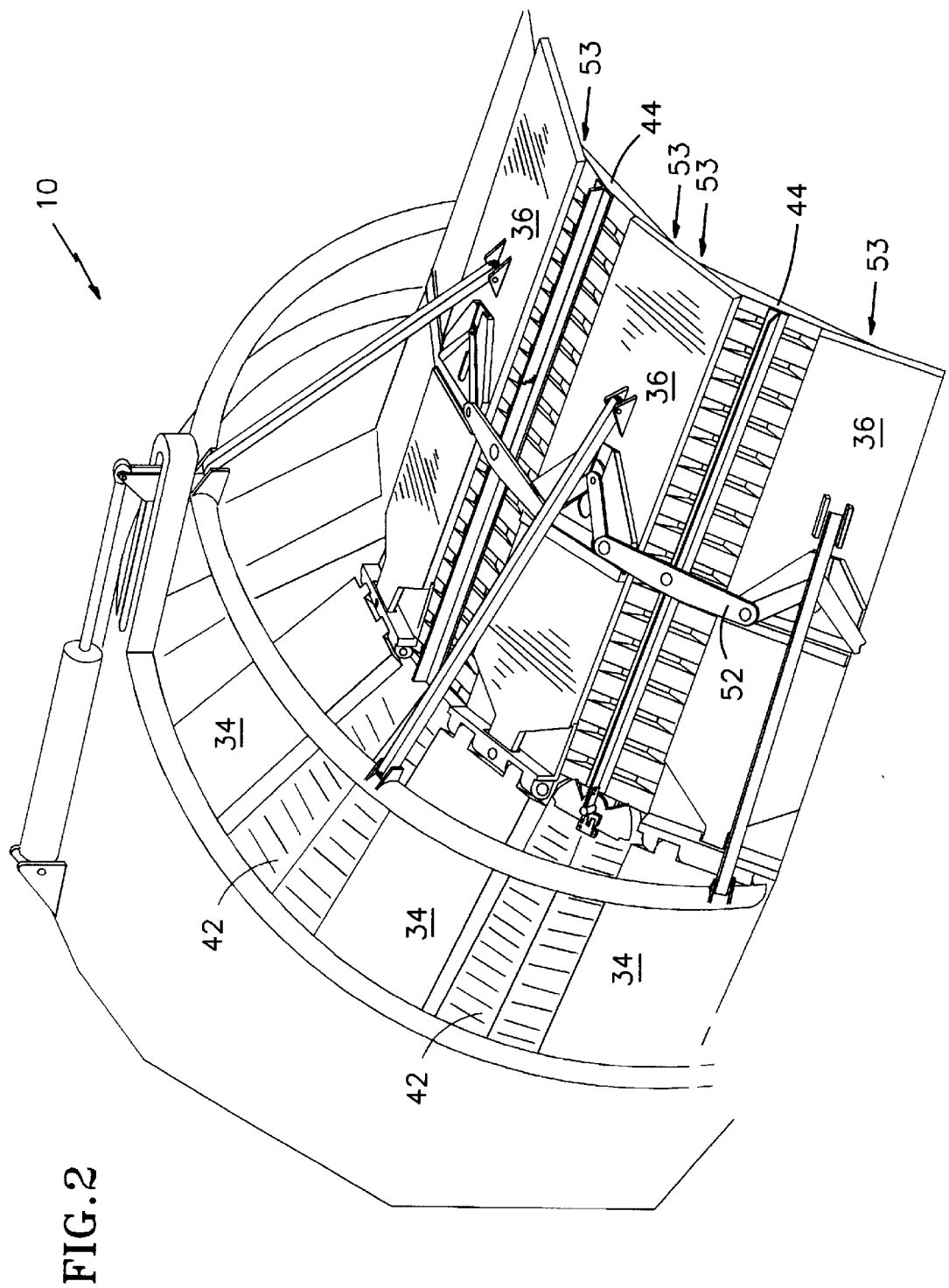
FIG. 2 is a diagrammatic perspective view of a convergent-divergent nozzle.
Figure 3:
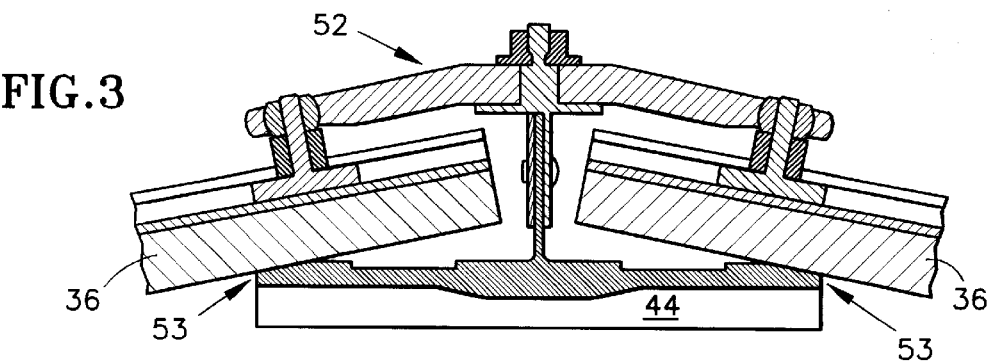
FIG. 3 is a diagrammatic sectional view of a pair of flaps and a flap seal disposed therebetween.
Figure 4:
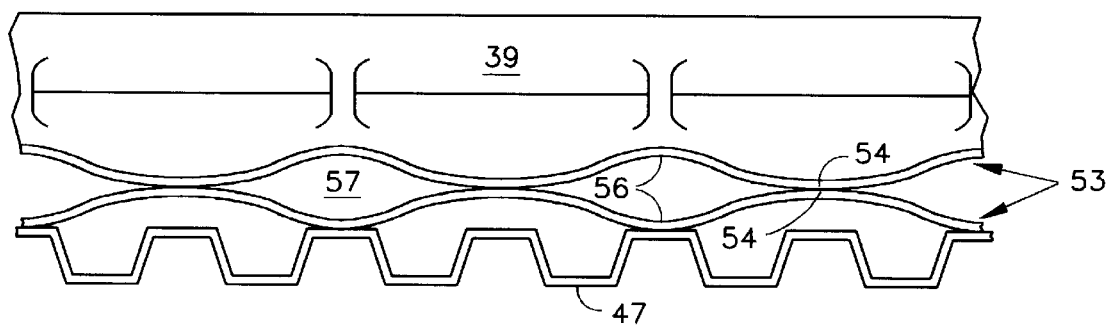
FIG. 4 is a diagrammatic lengthwise view of a flap and flap seal without coatings illustrating cooling air leak passages.
Figure 5:
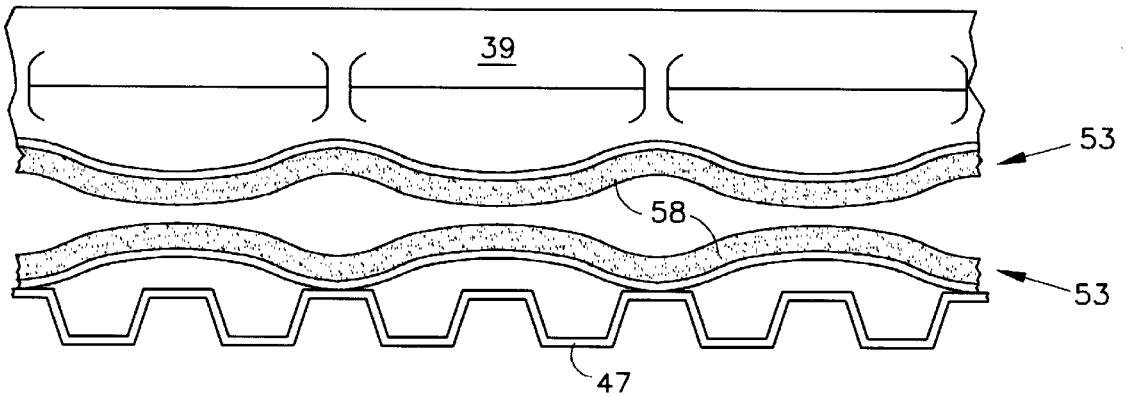
FIG. 5 is a diagrammatic lengthwise view of a flap and flap seal each having a coating of abradable material attached thereto.

Referring to FIGS. 1–3, the balance, convergent, and divergent sections 12,14,16 and the exterior fairing 18, each comprise a plurality of circumferentially distributed flaps 32,34,36,38 and flap seals 40,42,44, respectively. One half 48 of the nozzle 10 shown in FIG. 1 illustrates the flaps 32,34,36,38 of the balance 12, convergent 14, divergent 16, and exterior fairing 18 sections. The other half 50 of the nozzle 10 illustrates the flap seals 40,42,44, of the balance 12, convergent 14, and divergent 16 sections. The flaps 32,34,36 and flap seals 40,42,44 of the balance, convergent, and divergent sections are alternately disposed, with the flap seals disposed radially inward of the flaps, overlapping a portion of each adjacent flap. FIG. 2 illustrates the flap and flap seal relationship in the convergent 14 and divergent 16 sections. Linkages connect the flaps 32,34,36 and flap seals 40,42,44 and permit relative motion therebetween as the nozzle orifice 30 opens and closes. FIG. 3 illustrates a typical seal positioning linkage 52. The exterior fairing shown in FIG. 1 does not include flap seals for sealing between flaps. Rather, adjacent exterior fairing flaps 38 overlap themselves, as can be seen in FIG. 8. Alternative exterior fairing embodiments may include flaps and flap seals disposed in a manner similar to that of the flaps and flaps seals shown in FIGS. 2 and 3. In all the nozzle sections 12,14,16,18, the flaps 32,34,36,38 and flap seals 40,42,44 are in lengthwise contact with each other. The surfaces of each flap 32,34,36,38 and flap seal 40,42,44 where contact occurs may be referred to as the "seal surface(s)" 53 of that particular flap or flap seal. FIG. 3 is a diagrammatic cross-section illustrating the seal surfaces 53 (extending into the page) between, for example, a divergent flap 36 and a divergent flap seal 44.

FIGS. 4–7 depict a generic flap 39 and flap seal 47 to better illustrate sealing between flaps and between flaps and flap seals. The seal surfaces 53 of flaps 39 and flap seals 47 are typically not perfectly flat. Deviations from flatness may be referred to as high points 54 and depressions 56. Openings 57 (see FIG. 4) between the flap 39 and flap seal 47 created by the high points 54 and the depressions 56 may be referred to as cooling air leakage paths.

Referring to FIGS. 1 and 5–7, the seal surfaces 53 of the flap 39 and flap seal 47 are coated with an abradable coating 58. The preferred composition of the abradable coating 58 will vary depending on the section 12,14,16,18 of the nozzle 10 (FIG. 1) in which it is used. The balance section 12, for example, is exposed to cooling air which passes outboard of the augmentor liner 26 and flows into the annulus 62 disposed between the augmentor liner 26 and the balance and convergent sections 12,14 (see FIG. 1). The temperature of the cooling air permits the use of a coating material having a lower thermal tolerance than is permissible in the exposed convergent 14 or divergent 16 sections (FIG. 1). An aluminum-polyester composite is an example of an abradable coating 58 which can be used in the balance section 12. In the exposed convergent 14 or divergent 16 sections an abradable material having a higher thermal tolerance, such as a polyimide, a graphite, or a ceramic, would be more appropriate because of their proximity to core gas flow.

Referring to FIGS. 1 and 7, the seal surfaces 53 of the flap 39 and flap seal 47 may also be coated with an abrasion resistant coating 64 to retard detrimental wear due to friction between the seal surfaces 53. The abrasion resistant coating 64 is attached to the seal surface 53 of the flap 39 and/or flap seal 47 and the abradable coating 58 is attached over the abrasion resistant coating 64. The preferred composition of the abrasion resistant coating 64 can be selectively varied in dimension and/or composition along the length of the section 12,14,16,18 of the nozzle 10 (FIG. 1) in which it is being used to optimize service life. An abrasion resistant coating 64 comprising tungsten carbide, for example, may be used in the convergent 14 and/or divergent 16 section where flaps 34,36 and flap seals 42,44 are influenced directly by core gas temperatures and cooling air.

Referring to FIGS. 1 and 5–7, during operation of the engine, the nozzle orifice 30 created at the intersection of the convergent 14 and divergent sections 16 is actuated radially inward and outward to vary the orifice 30 cross-sectional area. Actuating the orifice 30 (or skewing a vectorable nozzle) causes the flaps 32,34,36,38 and flap seals 40,42,44 of the balance 12, convergent 14, and divergent 16 sections, and the external fairing 18 to move relative to one another. The relative movement between adjacent flaps 32,34,36,38 and flap seals 40,42,44 causes the abradable coating 58 (FIGS. 5–7) applied to the seal surfaces 53 to abrade, or "lap". The abradable coating 58 attached to the high points 54 comes into contact first and abrades relatively quickly, thereby reducing the cross-sectional areas of the openings 57. The rate of abrasion decreases as the amount of surface area in contact between the flap and flap seal increases because the load forcing the flap and flap seal together is distributed over a greater area, which results in a decrease in normal force at any particular point. Frictional wear, which is directly related to the normal force, is accordingly decreased. Within a relatively short period of time the adjacent flaps and flap seals become "lapped in" relative to one another, leaving a substantially parallel contact surface 65 between the flap 32,34,36,38 and flap seal 40,42,44 (see FIGS. 6 and 7). Whatever leakage paths may have otherwise existed between the flap 32,34,36,38 and flap seal 40,42,44 are consequently minimized or eliminated. The decrease in frictional wear created by the lapped-in abradable coating 58 also increases the usable life of the flap 32,34,36,38 and flap seals 40,42,44. In the embodiment employing a abrasion resistant coating 64 (FIG. 7), the lapping may expose wear coating covered high points. In those cases, frictional wear is further retarded by the higher durability of the abrasion resistant coating 64.

The abradable coating 58 may also provide a means for lubricating between the flaps 32,34,36,38 and flap seals 40,42,44. In one embodiment, an abradable coating 58 is used having a coefficient of friction substantially lower than that of the flap 32,34,36,38 and/or flap seal 40,42,44 material. The lower coefficient of friction facilitates movement between the flaps 32,34,36,38 and flap seal 40,42,44. In another embodiment, the abradable coating 58 includes a lubricating material encased within the coating 58 that is released as the abradable material wears. For example, a metal matrix composite abradable coating with polyester encased as a lubricating material would be acceptable. The polyester encased within the metal matrix composite is protected from the harsh environment by the metal matrix and is dispensed as the metal matrix abrades.

Although this invention has been shown and described with respect to the detailed embodiments thereof, it will be understood by those skilled in the art that various changes in form and detail thereof may be made without departing from the spirit and scope of the claimed invention. For example, the best mode has described the present invention as being used within a circular nozzle. Alternatively, it may be advantageous to use the present invention in a nozzle having straight sections such as a rectangular nozzle.

We claim:

1. An exhaust nozzle for a gas turbine engine, comprising:

a plurality of flaps, each said flap having a seal surface with depressions disposed therein, said flaps pivotly attached to a structure disposed within the engine;

wherein adjacent flaps overlap along said seal surfaces, and movement of said nozzle causes relative motion between said adjacent flaps; and an abradable coating, attached to said seal surfaces, wherein contact between adjacent flaps causes said abradable coating to abrade, leaving said abradable coating in said depressions within said seal surfaces to which said abradable coating is attached.

2. An exhaust nozzle according to claim 1, wherein said abradable material further comprises means for lubricating between said flaps along said contact surfaces.

3. An exhaust nozzle for a gas turbine engine, comprising:

a plurality of flaps, each said flap having a first seal surface with first depressions disposed therein;

a plurality of flap seals, each said flap seal having a second seal surface with second depressions disposed therein;

wherein said flaps and flap seals are alternately disposed about a structure within the engine, said flaps pivotly attached to said structure, and wherein adjacent flap and flap seals overlap along said first and second seal surfaces, and movement of said nozzle causes relative motion between said flaps and flap seals; and an abradable coating, attached to at least one of said first or second seal surfaces, wherein contact between said flaps and said flap seals along said first and second seal surfaces causes said abradable coating to abrade, leaving said abradable coating in said first or second depressions of said first or second seal surface to which said abradable coating is attached.

4. An exhaust nozzle according to claim 3, wherein said abradable material further comprises means for lubricating between said flap and flap seals along said first and second seal surfaces.

5. An exhaust nozzle according to claim 3, wherein said abradable coating is attached to both said first and second seal surfaces, and wherein contact between flap and flap seals along said first and second seal surfaces causes said abradable coatings to abrade, leaving said abradable coating in said first and second depressions of said first and second seal surfaces, thereby minimizing gas passage between said flap and said flap seal.

6. An exhaust nozzle according to claim 5, wherein said abradable material further comprises means for lubricating between said flap and flap seals along said first and second seal surfaces.

7. An exhaust nozzle for a gas turbine engine, comprising:

a plurality of flaps, each said flap having a first seal surface with first depressions disposed therein;

a plurality of flap seals, each said flap seal having a second seal surface with second depressions disposed therein;

wherein said flaps and flap seals are alternately disposed about a structure within the engine, said flaps pivotly attached to said structure, and wherein adjacent flap and flap seals overlap along said first and second seal surfaces, and movement of the nozzle causes relative motion between said flaps and flap seals;

a wear coating, attached to said first and second seal surfaces;

an abradable coating, attached to said wear coating on said first and second seal surfaces, wherein contact between said flap and flap seals causes said abradable coating to abrade, leaving said abradable coating in said first and second depressions, thereby minimizing gas passage between said flaps and flap seals.

8. An exhaust nozzle according to claim 7, wherein said abradable material further comprises means for lubricating between said flap and flap seals along said first and second seal surfaces.

9. An exhaust nozzle according to claim 7, wherein said abradable coating is attached to both said first and second seal surfaces, and wherein contact between said flaps and flap seals causes said abradable coatings to abrade, leaving said abradable coating in said first and second depressions of said first and second seal surfaces, thereby minimizing gas passage between said flaps and flap seals.

10. An exhaust nozzle according to claim 9, wherein said abradable material further comprises means for lubricating between said flap and flap seals along said first and second seal surfaces.

* * * * *